(12) United States Patent
Zhang et al.

(10) Patent No.: US 10,911,623 B1
(45) Date of Patent: Feb. 2, 2021

(54) ASSET MANAGEMENT FRAMEWORK FOR CUSTOMIZING MULTIFUNCTION PERIPHERAL CONFIGURATIONS

(71) Applicant: Toshiba TEC Kabushiki Kaisha, Shinagawa-ku (JP)

(72) Inventors: Jia Zhang, Irvine, CA (US); Christopher Nguyen, Huntington Beach, CA (US); Marianne Kodimer, Huntington Beach, CA (US); Brendon Wai, Lake Forest, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/588,069

(22) Filed: Sep. 30, 2019

(51) Int. Cl.
*G06F 3/12* (2006.01)
*H04N 1/00* (2006.01)

(52) U.S. Cl.
CPC ....... *H04N 1/00511* (2013.01); *G06F 3/1203* (2013.01); *G06F 3/1238* (2013.01); *H04N 1/00503* (2013.01); *H04N 1/00506* (2013.01); *H04N 1/00514* (2013.01)

(58) Field of Classification Search
None
See application file for complete search history.

(56) References Cited

U.S. PATENT DOCUMENTS

| | | | | |
|---|---|---|---|---|
| 2012/0069386 A1* | 3/2012 | St. Laurent | ............. | G06F 3/122 358/1.15 |
| 2015/0172504 A1* | 6/2015 | Sato | .................... | H04N 1/32021 358/1.13 |
| 2017/0346969 A1* | 11/2017 | Kaigawa | ............ | H04N 1/00413 |
| 2019/0174018 A1* | 6/2019 | Kawabata | .......... | H04N 1/00973 |
| 2019/0306346 A1* | 10/2019 | Nakamura | ......... | H04N 1/00474 |
| 2019/0356797 A1* | 11/2019 | Nagasawa | .......... | H04N 1/00514 |
| 2020/0019350 A1* | 1/2020 | Nishikai | ................. | G06F 3/121 |

* cited by examiner

*Primary Examiner* — Henok Shiferaw
(74) *Attorney, Agent, or Firm* — Ulmer & Berne LLP

(57) ABSTRACT

A system and method of managing assets for customizing user interfaces of multifunction peripherals includes an asset management system that includes a memory for storing assets such as background images, logos, taglines, applications, and configuration templates. An associated processor determines the permission level of the user or administrator and provides access to assets based on the permission level of the respective user or administrator. The permission level of the user or administrator is based on the associated level within the tiered permission topology of asset management system. Users can use assets of administrators and other users to generate customized user interfaces for multifunction peripherals using assets of anyone in a child, peer, or parent relationship, but are restricted from performing administrative operations, such as editing and deleting of assets, on assets of other users and administrators. Administrators are restricted from performing administrative operations on assets of higher tiers.

12 Claims, 10 Drawing Sheets

ASSET MANAGEMENT FRAMEWORK FOR CUSTOMIZING MULTIFUNCTION PERIPHERAL CONFIGURATIONS

TECHNICAL FIELD

This application relates generally to managing assets for customizing configurations on multifunction peripherals. The application relates more particularly to an asset management framework for sharing customized user interface templates and assets for user interfaces of multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Customization assets, such as background images, logo images, icons, and applications, are typically combined into a package and deployed to one or more MFPs by an administrator. Selecting displayable images and application binary files for customizing MFPs is a time-consuming job for administrators.

BRIEF DESCRIPTION OF THE DRAWINGS

Various embodiments will become better understood with regard to the following description, appended claims and accompanying drawings wherein:

FIG. 5 is an example embodiment of a template management interface;

FIG. 8 is an example embodiment of a background image management interface;

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs include user interfaces, such as touchscreens, for user operation and control. A typical user interface is set by a manufacturer and not subject to user modification. More recent advances allow end users to generate customized device interfaces that may be specific to their needs, such as by providing access to frequently needed functions for easy location and selection. Different business types may have different basic device needs. MFPs in a hospital may require ready access to electronic health records, insurance forms, prescription forms, patient questionnaires, and the like. MFPs in hospitals may also require enhanced security features, such as encryption or disabling or limiting information reproduction or transfer to maintain patient confidentiality. MFPs in law office may require ready access to legal forms, and be configured to generate bound material, such as printouts of deposition transcripts. A company may also wish to configure a user interface to incorporate a company logo, such as in a user interface background.

As noted above, it is a time-consuming and error prone job for administrators to create each of these customization packages for MFPs. Example embodiments herein provide an asset management framework for administrators and users to manage customization assets used to build MFP configurations. The asset management framework also provides permission management for different levels of users and administrators. The asset management framework provides a mechanism for users and administrators to upload various types of assets such as background images, logo images, icons, and applications. The asset management framework checks uploaded images to ensure that the images meet the system requirements, such as size, file type, and so forth. The asset management framework provides a user interface that makes clear what are the required fields and system requirements. The asset management framework can check application metadata and other properties in order to detect any errors in an application package.

Figure 1:
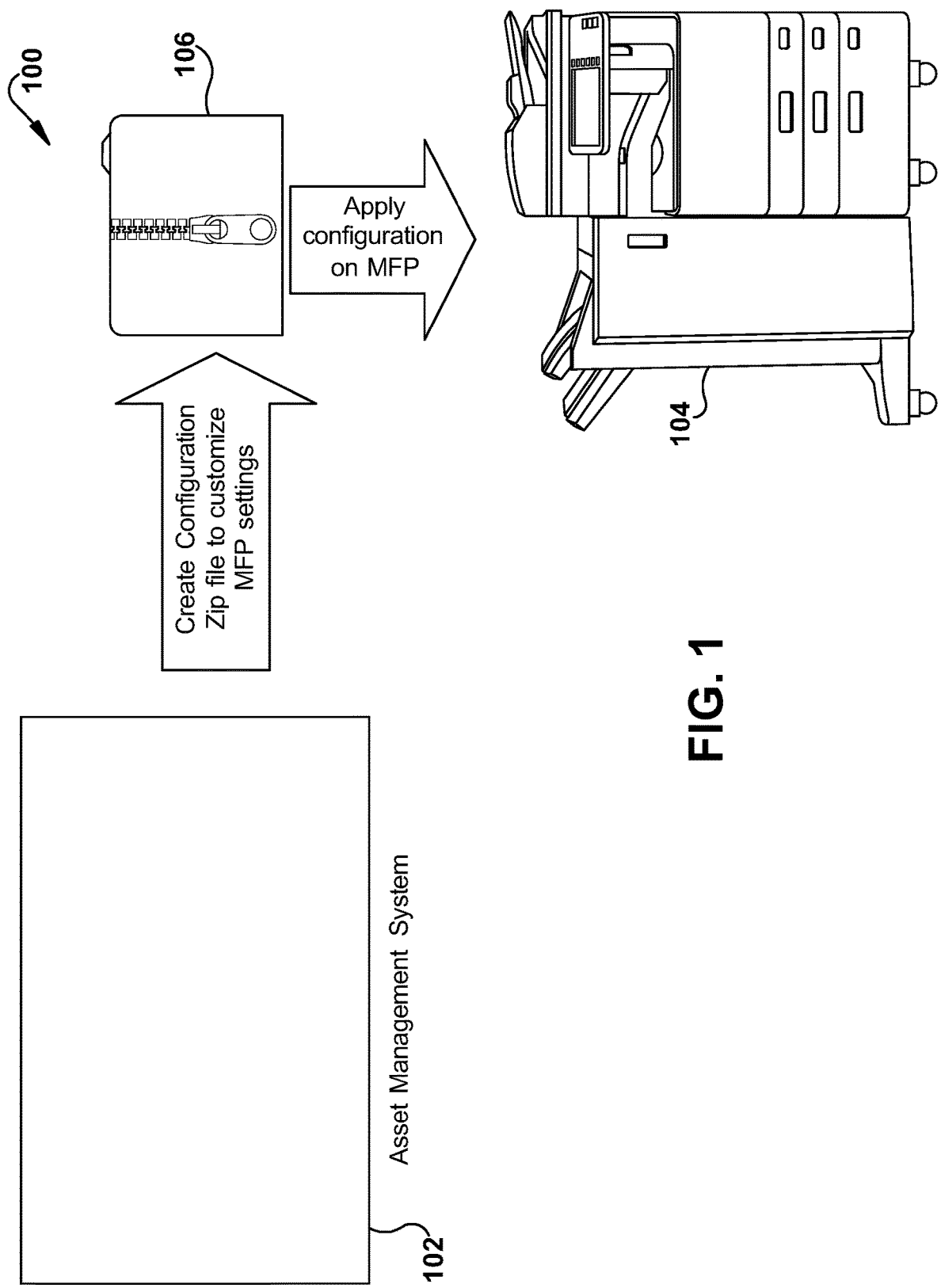
FIG. 1 is an example embodiment of an asset management framework.

In accordance with the subject application, FIG. 1 illustrates an example embodiment of an asset management framework 100. The asset management framework 100 includes an asset management system 102 that allows users and administrator to create customized MFP settings for MFPs, illustrated by way of example by MFP 104. The customized MFP settings are suitably combined into a single package, for example a zip file 106, that is distributed to MFPs such as MFP 104 via a network, suitably comprised of any wireless or wired local area network (LAN) or a wide area network (WAN) which can comprise the Internet, or any suitable combination thereof.

Figure 2:
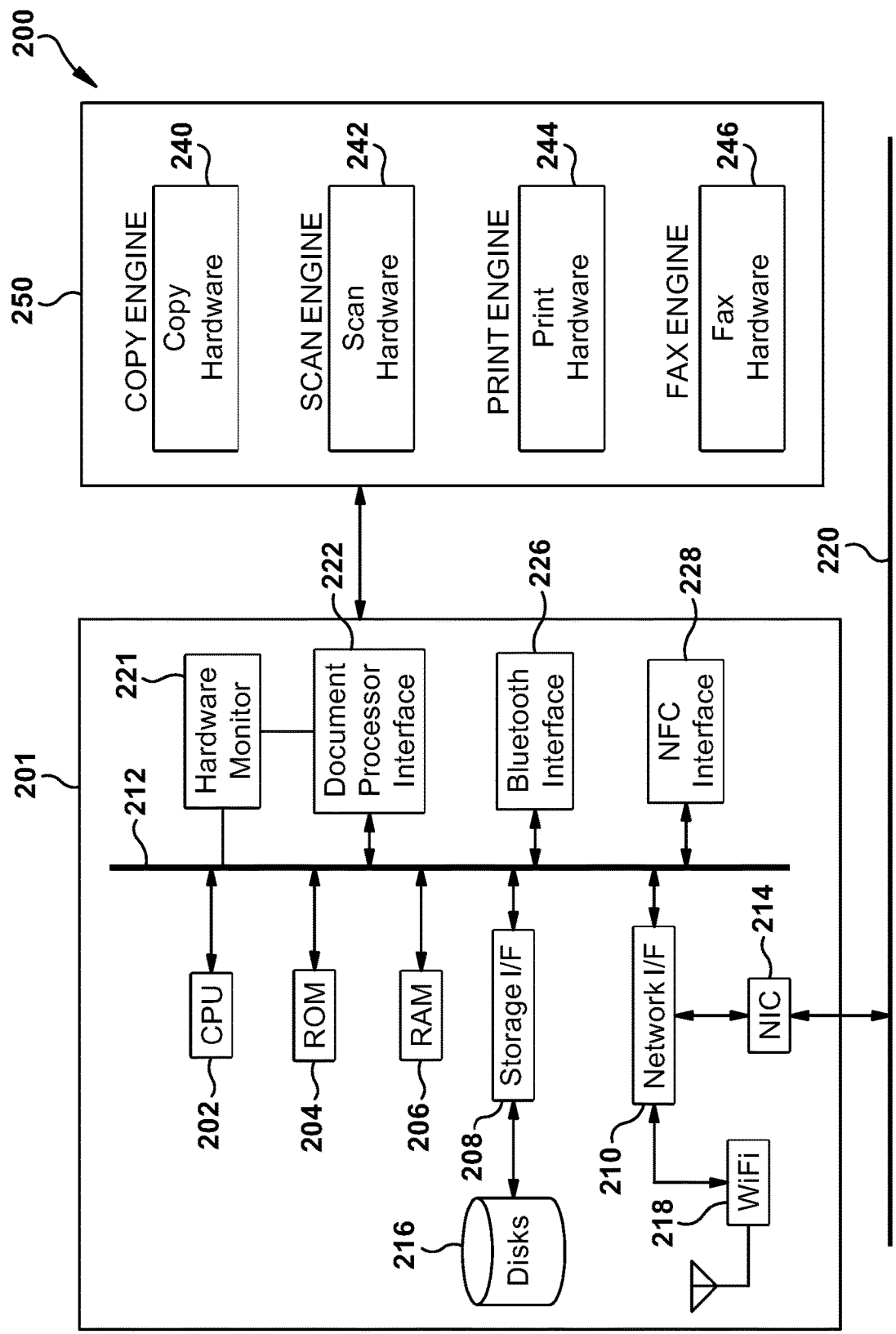
FIG. 2 is an example embodiment of a multifunction peripheral.

Turning now to FIG. 2 illustrated is an example embodiment of a networked digital device comprised of document rendering system 200 suitably comprised within an MFP, such as with MFP 104 of FIG. 1. As noted above, an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
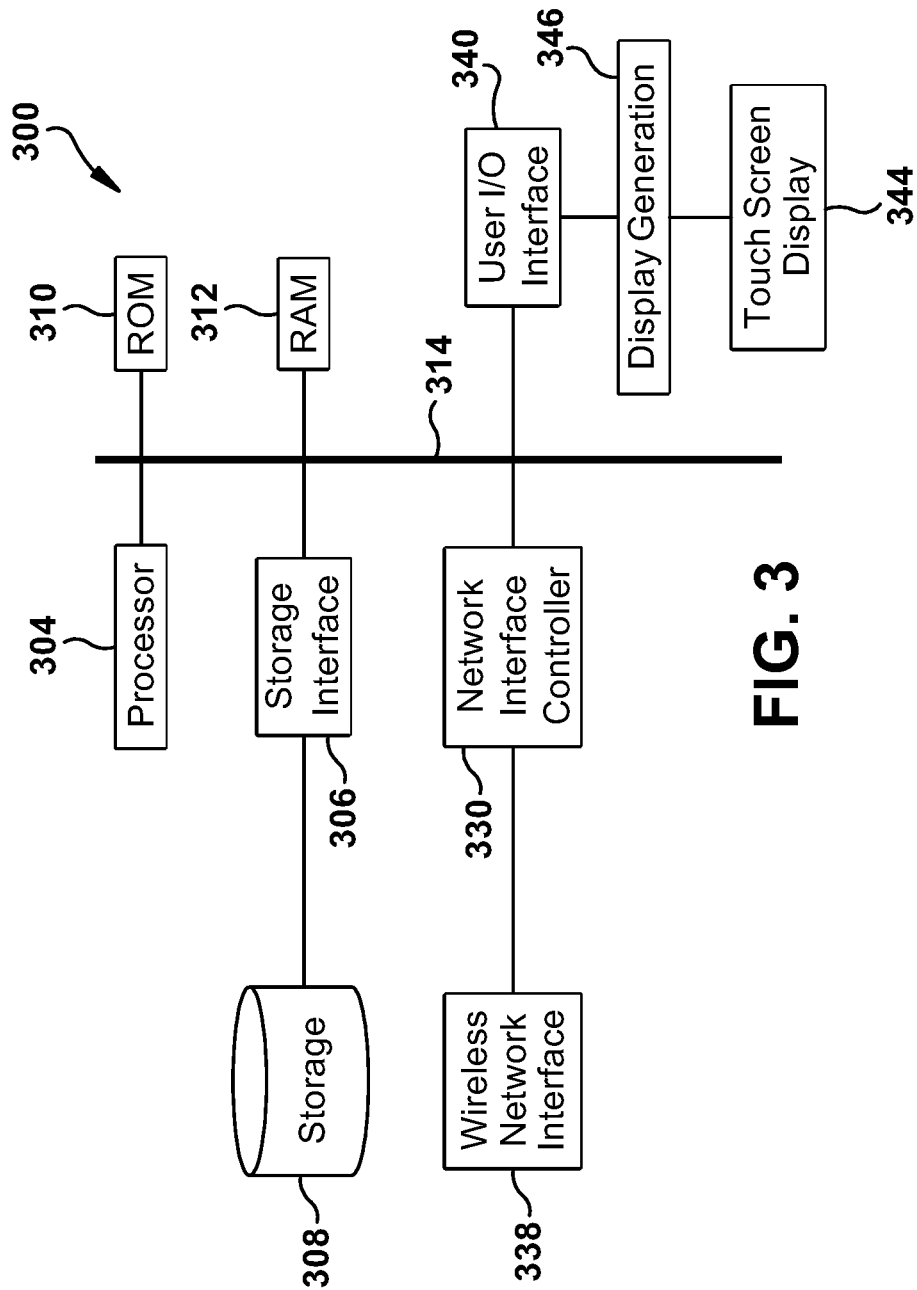
FIG. 3 is an example embodiment of a digital device such as a portable digital device.

Turning now to FIG. 3, illustrated is an example of a digital device system such as system 100 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide arear network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. Processor 304 is also in data communication with Bluetooth interface 350 and NFC interface 354. It will be understood that functional units are suitably comprised of intelligent units, including any suitable hardware or software platform.

Figure 4:
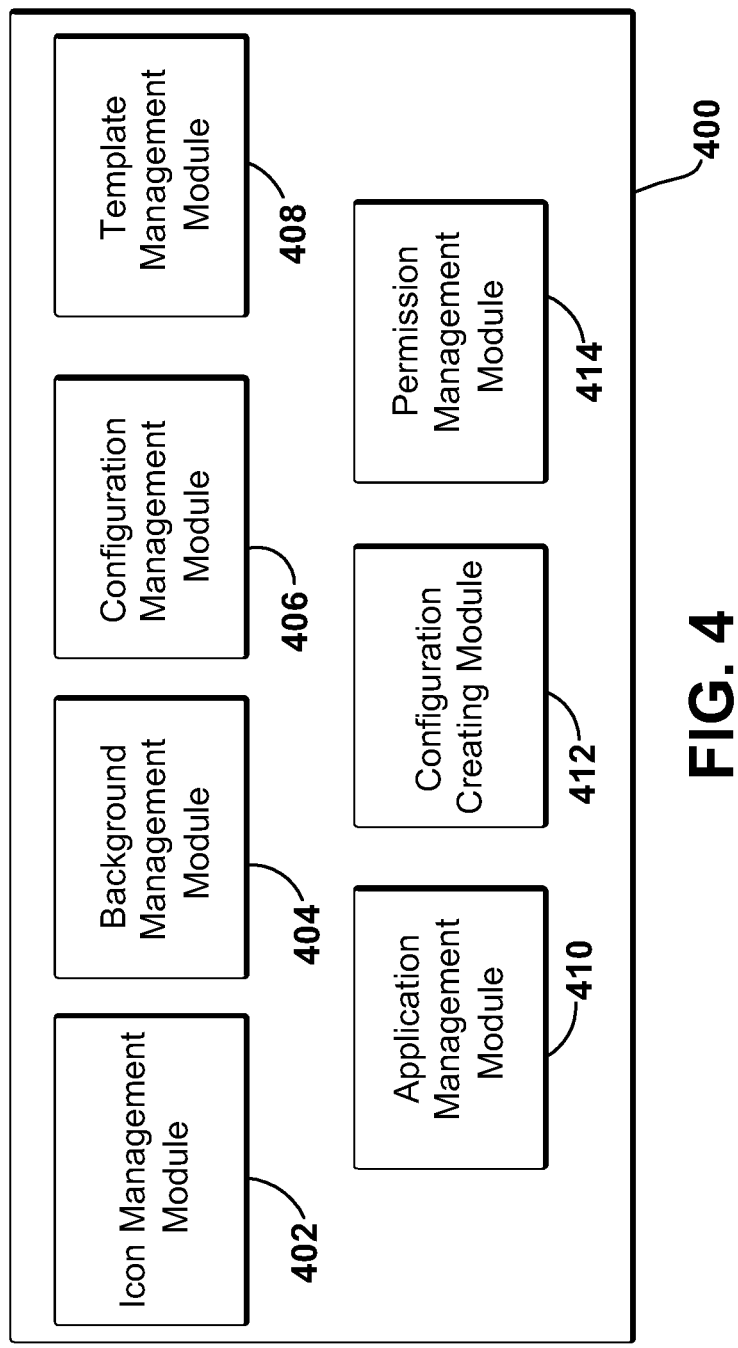
FIG. 4 is an example embodiment of software modules for an asset management system.

Turning next to FIG. 4, illustrated are example software modules of an asset management system 400. An icon management module 402 allows users to upload icons used to represent applications and other functions. The icon management module 402 checks icons for compliance and allows users to select available icons for building MFP customization packages. A background management module 404 allows users to upload background images that are displayed on the user interface of the MFP. The background management module 404 checks uploaded images for compliance and allows users to select available background images for building MFP customization packages. A configuration management module 406 validates customization packages and determines whether a customization package complies with requirements of the MFP to which it is deployed.

A template management module 408 allows users to select an existing template that can be further customized according to the user's needs. Example templates include assets such as background images, logos, icons, and applications that have been configured into a desired configuration for customizing the MFP user interface. An application management module 410 allows users to select applications that are made available via an MFP's user interface. A configuration creating module 412 provides a user interface that allows users to build customized configurations that are deployed to MFPs.

A permission management module 414 enforces permission management of assets and templates. As described below in greater detail with regard to FIG. 9, the asset management framework provides a multi-level topology for users and administrators. Various tiers can be configured, such as region tiers, operating company tiers, and dealer or organization tiers. At each tier, users and administrators have different permission levels. Administrators have permission levels that allow them to create, delete, and modify assets. Users have permission levels that allow them to create or modify configurations using the assets.

Figure 5:
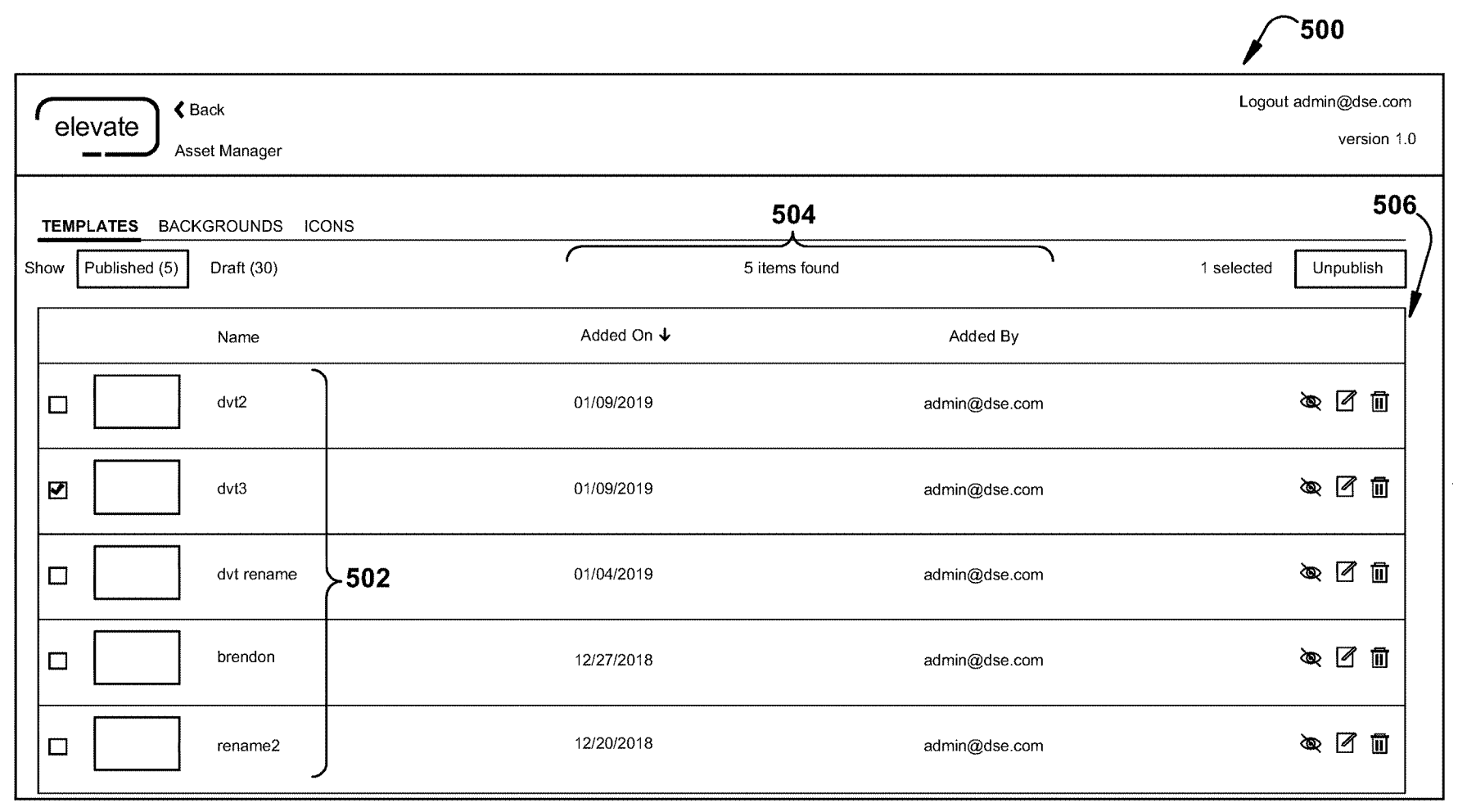

FIG. 5 illustrates an example template management interface 500. Each template 502 can include an icon to assist users in identifying the template 502. Each template 502 can include identifying information 504 such as creation date and identification of the user or administrator who created the template. Action buttons 506 permit the user or administrator to delete, download, or modify attributes of a template. Certain action buttons 506 can be greyed out and unselect-able if the particular user or administrator does not have sufficient permission to perform the desired action. A published, or active, mode makes the template available to other users and administrators, while an unpublished, or draft, mode allows the user or administrators to create a library of templates that are not shared with others. The user or administrator can move templates from one mode to the other mode.

Figure 6:
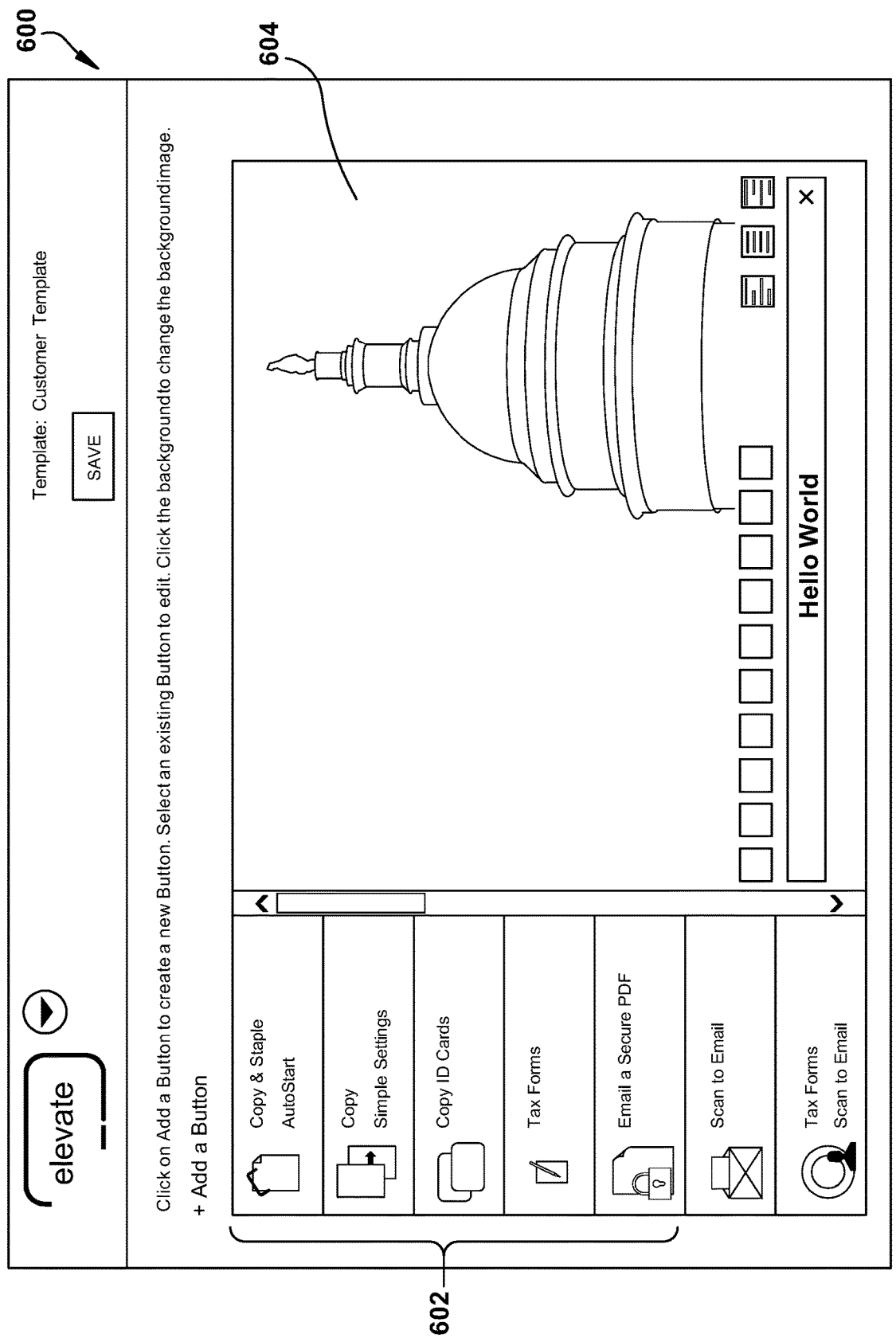
FIG. 6 is an example embodiment of a template management interface.

FIG. 6 illustrates an example template 600. The template includes a set of applications 602 that are displayed on the user interface of the MFP. Example applications can include a copy application, a copy and staple application, a scan to email application, and so forth. Each of the applications can be identified by an icon that represents the action available via the application. The template 600 can also include a background image 604 which can include logos, graphics, one or more messages or tag lines, and so forth. The user is able to edit the assets, for example by changing the background image 604, position of one or more messages, change the background color, and reorder, add, or remove applications. The user can then save the changes as a new template.

Figure 7:
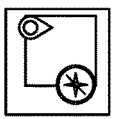
FIG. 7 is an example embodiment of an application management interface.

FIG. 7 is an example embodiment of an application management interface. The user can modify an application. The user can change the way the application is presented on the user interface of the MFP, for example by changing the name, the icon associated with the application, or the description of the action performed by the application. The user can identify the type of application, for example whether the application is identified with printing, copying, faxing, emailing, and so forth.

Figure 8:
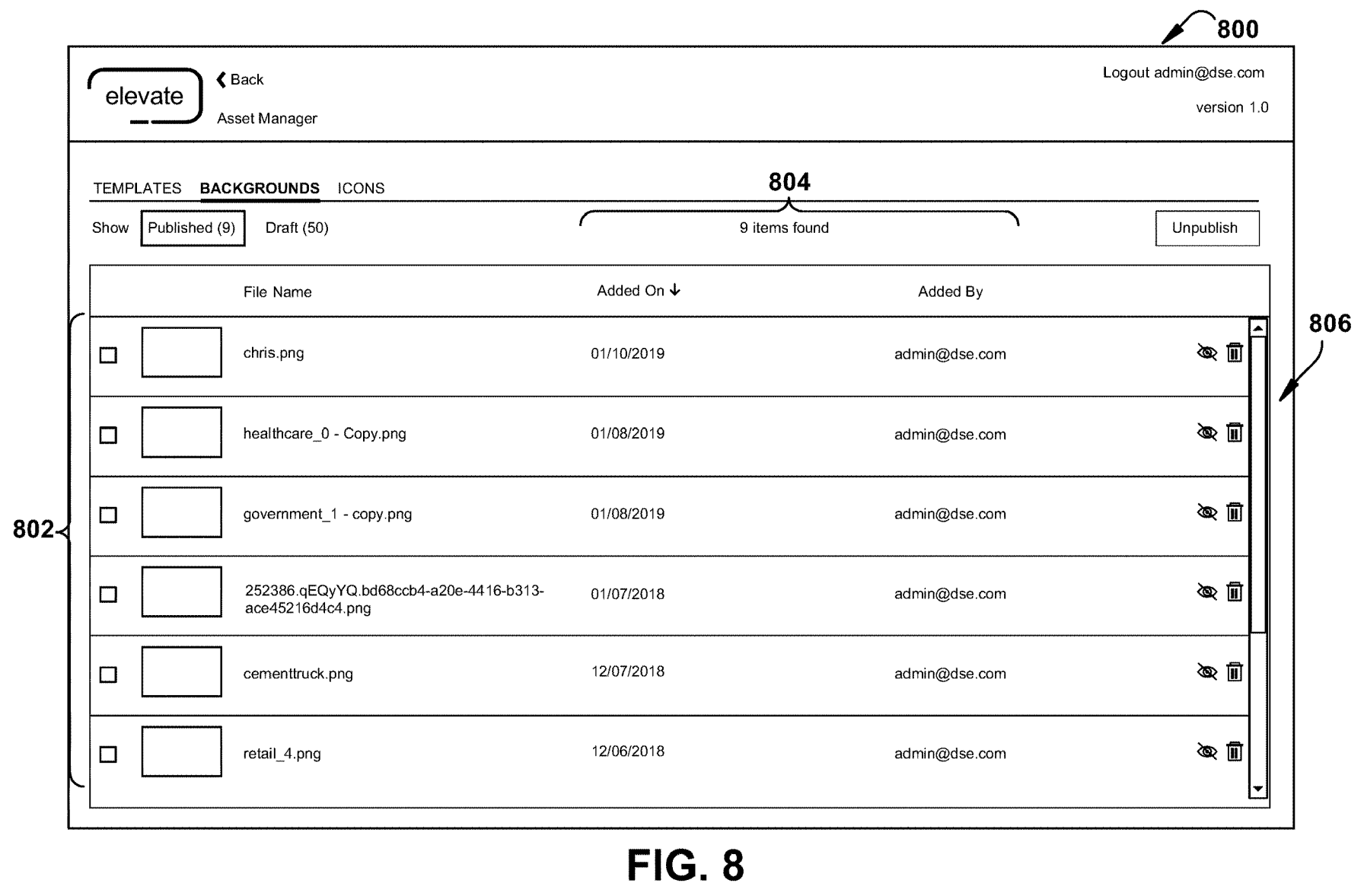

FIG. 8 is an example embodiment of a background image management interface 800. The user can add, delete, or select background images 802 that are used to create templates and customized user interfaces for MFPs. Each of the background images 802 is identified by a thumbnail representative of the background image 802. Each background image 802 can include identifying information 804 such as creation date and identification of the user or administrator who created the background image 802. Action buttons 806 permit the user or administrator to delete, download, or modify attributes of a background image 802. Certain action buttons 806 can be greyed out and un-selectable if the particular user or administrator does not have sufficient permission to perform the desired action. Similar interfaces are available for other types of assets, such as icons, logos, taglines, background colors, and so forth as would be understood by one of ordinary skill in the art.

Figure 9:
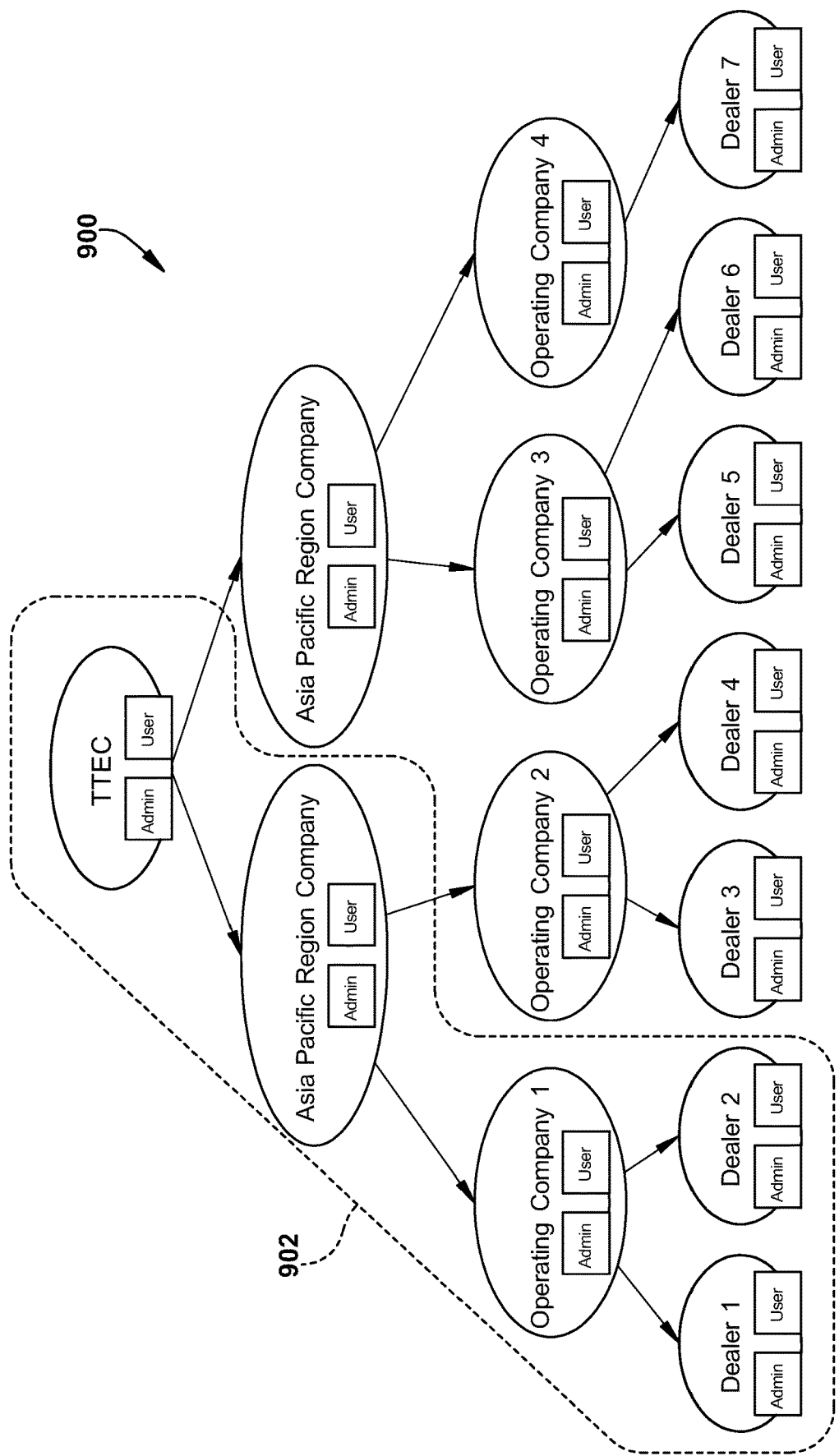
FIG. 9 is an example embodiment of a permission topology.
Figure 10:
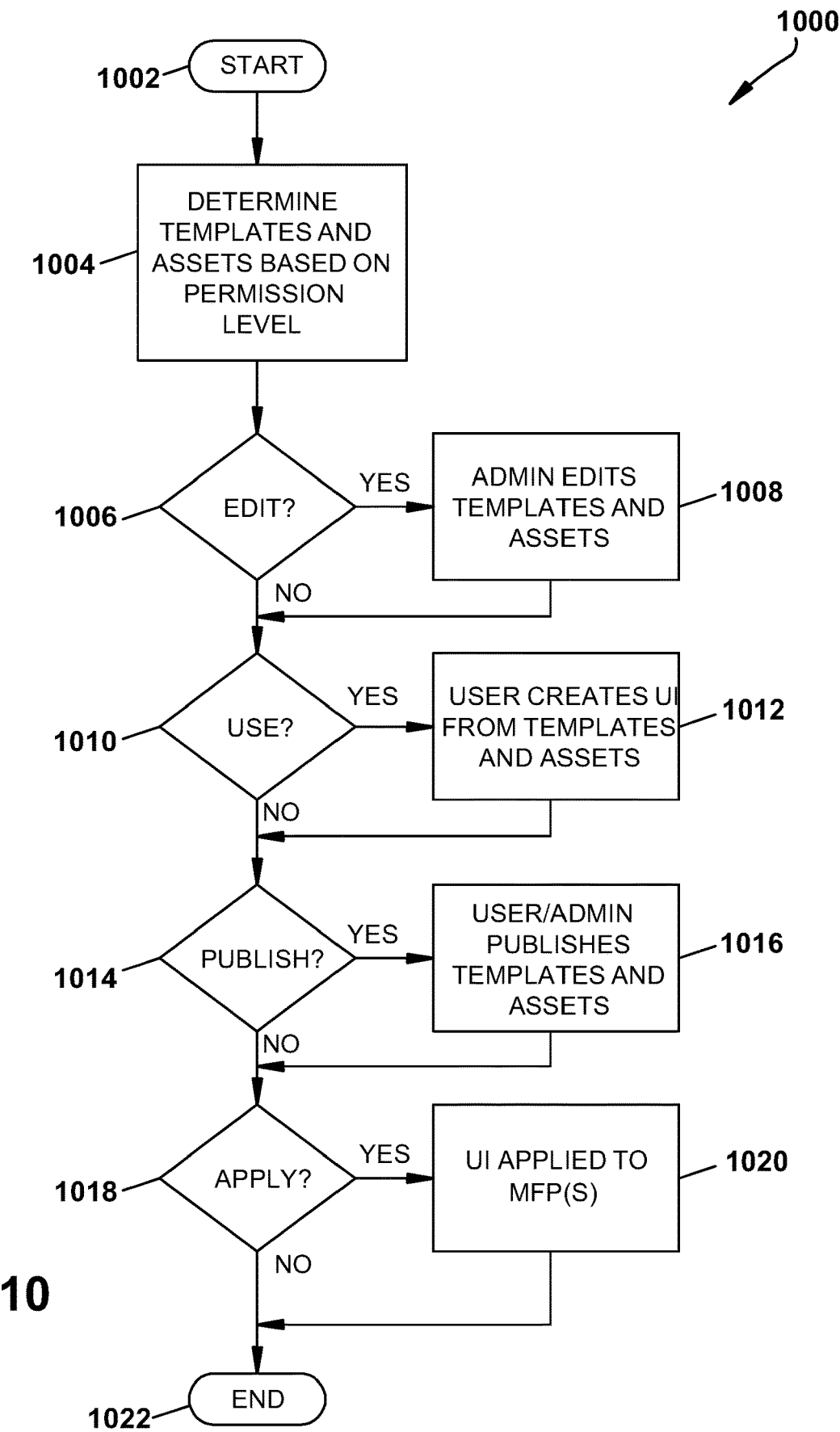
FIG. 10 is a flowchart of example operations of an asset management system.

FIG. 9 is an example embodiment of a permission topology for an asset management system. The asset management framework provides a multi-level topology for users and administrators that enforces permission management of assets and templates. Various tiers can be configured, such as region tiers, operating company tiers, and dealer or organization tiers as presented in the example illustrated in FIG. 9.

Each tier consists of a set of users and administrators. Users and administrators have different permission levels. Administrators have permission levels that allow them to create, delete, and modify assets. Users have permission levels that allow them to create or modify configurations using the assets.

The relationship between different tiers of users is a parent-child relationship. Each child has one parent, while each parent can have multiple children. Users and administrators have read permission to read all of the assets created by the top tier, at the same tier, and lower tiers. For example, users and administrators at Operating Company 1 in the illustrated example can view all of the assets in the selected group 902. Only an administrator is able to create assets at the specific tier while higher tier administrators can modify assets of lower tiers.

FIG. 5 is a flowchart 1000 of example operations of an embodiment of an asset management system. The process commences at block 1002 and proceeds to block 1004 wherein the asset management system determines which templates and assets are visible to a particular user or administrator based on their tier and permissions.

At block 1006, if an administrator has sufficient privileges, the administrator can select to edit a template or asset. If so, then at block 1008 the administrator can add a new asset or template or delete an existing asset or template.

At block 1010, a user can select a template to use as the start to a new user interface for an MFP. If so, then at block 1012 the user edits the template, for example by changing the background, tag lines or logos, or by modifying the order or list of applications that will be shown on the user interface of the MFP to which the configuration is deployed.

At block 1014, the user or administrator can select to publish a template or asset. If so, then at block 1016 the template or asset becomes usable to other users based on their permission levels and position in the multi-tier topology of the asset management system as described above for FIG. 9. Similarly, the user or administrator can opt to remove a template or asset from published to draft status, for example if the user or administrator desires to update or change the template.

At block 1018, the user or administrator can select to deploy a customization package to one or more MFPs. If so, then at block 1020 the selected user interface template can be packaged into a customization packet and deployed to selected MFPs. The process ends at block 1022.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. An asset management system comprising:
a memory storing displayable assets, templates, and applications for customizable user interfaces of multifunction peripherals;
a network interface configured for data communication with a plurality of multifunction peripherals; and
a processor configured to
determine a permission level of a user or an administrator based at least in part on an associated level of the user or the administrator within a tiered permission topology of the asset management system,
receive a plurality of inputs from the user or the administrator to
customize a user interface for a multifunction peripheral using one or more of the displayable assets, templates, and applications, or
perform one or more administrative operations on one or more of the displayable assets, templates, and applications,
generate a customized user interface based on one or more of the received plurality of inputs, and
deploy the customized user interface to one or more multifunction peripherals via the network interface, and wherein,
an administrator is restricted from performing administrative operations on displayable assets, templates, and applications associated with a higher tier of the tiered permission topology, or
the displayable assets, templates, and applications available to each user and each administrator for customizing the user interface are based on the determined permission level of the respective user or administrator, or
the displayable assets, templates, and applications available to the user is limited to those associated with administrators and other users that are in a child, peer, or parent relationship with the user within the tiered permission topology.

2. The asset management system of claim 1, wherein each user or administrator is limited to performing a set of administrative operations based on the determined permission level of the respective user or administrator.

3. The asset management system of claim 2 wherein the set of administrative operations includes one or more of an edit operation, a delete operation, an add operation, and a change active status operation.

4. The asset management system of claim 3 wherein changing the active status of a displayable asset, a template, or an application to a published status makes it available for use by administrators and other users that are in a child, peer, or parent relationship with the user within the tiered permission topology.

5. The asset management system of claim 4 wherein changing the active status of a displayable asset, a template, or an application to a draft status makes it unavailable to other users.

6. The asset management system of claim 2 wherein each user is limited to performing administrative operations on displayable assets and templates associated with the user.

7. The asset management system of claim 1 wherein each displayable asset is selected from the group consisting of a background image, an icon, a tagline, and a logo.

8. A method comprising:
   storing, in a memory of an asset management system, displayable assets, templates, and applications for customizable user interfaces of multifunction peripherals;
   determining, by a processor of the asset management system, a permission level of a user or an administrator based at least in part on an associated level of the user or the administrator within a tiered permission topology of the asset management system;
   receiving a plurality of inputs from the user or the administrator to
      customize a user interface for a multifunction peripheral using one or more of the displayable assets, templates, and applications, or
      perform one or more administrative operations on one or more of the displayable assets and applications;
   generating a customized user interface based on one or more of the received plurality of inputs; and
   deploying the customized user interface to one or more multifunction peripherals via the network interface, and wherein,
      each user or administrator is limited to performing a set of administrative operations based on the determined permission level of the respective user or administrator and an administrator is restricted from performing administrative operations on displayable assets, templates, and applications associated with a higher tier of the tiered permission topology, or
      the displayable assets, templates, and applications available to each user or administrator for customizing the user interface are based on the determined permission level of the respective user or administrator or
      the displayable assets, templates, and applications available to the user is limited to those associated with administrators and other users that are in a child or parent relationship with the user within the tiered permission topology.

9. The method of claim 8 wherein the set of administrative options includes one or more of an edit operation, an add operation, and a change active status operation.

10. The method of claim 8 wherein each user is limited to performing administrative operations on displayable assets and templates associated with the user.

11. The method of claim 8 wherein each displayable asset is selected from the group consisting of a background image, an icon, a tagline, and a logo.

12. A system comprising:
   a memory configured to store a plurality of assets including one or more background images, icons, logos, taglines, templates, or applications; and
   a processor configured to receive a plurality of selections of at least some of the assets to generate a customized user interface for a multifunction peripheral,
   wherein each of the plurality of assets is associated with a particular level of a tiered permission topology associated with an owner of the particular asset, and
   wherein each of the plurality of assets is selectable for use in generating the customized user interface based at least in part on a comparison of the level of the asset with a level of a person making the selections,
   wherein each of the administrative operations is selected from an edit operation, a delete operation, an add operation, and a change active status operation, and
   wherein each administrative operation is available for selecting by the person only when the level of the person is equal to or greater than the level of the asset in the tiered permission topology.

* * * * *